United States Patent
Kim et al.

(10) Patent No.: US 9,851,825 B2
(45) Date of Patent: Dec. 26, 2017

(54) TOUCH SENSOR INTEGRATED TYPE DISPLAY DEVICE

(71) Applicant: LG Display Co., Ltd., Seoul (KR)

(72) Inventors: Cheolse Kim, Daegu (KR); Sangsoo Hwang, Seoul (KR)

(73) Assignee: LG Display Co., Ltd., Seoul (KR)

( * ) Notice: Subject to any disclaimer, the term of this patent is extended or adjusted under 35 U.S.C. 154(b) by 288 days.

(21) Appl. No.: 14/540,199

(22) Filed: Nov. 13, 2014

(65) Prior Publication Data

US 2015/0145821 A1  May 28, 2015

(30) Foreign Application Priority Data

Nov. 28, 2013 (KR) .......................... 10-2013-0146493

(51) Int. Cl.
*G06F 3/041* (2006.01)
*G06F 3/044* (2006.01)

(52) U.S. Cl.
CPC ............. *G06F 3/0412* (2013.01); *G06F 3/044* (2013.01); *G06F 2203/04111* (2013.01)

(58) Field of Classification Search
CPC ................... G06F 3/044; G06F 3/0412; G06F 2203/04111
USPC ....................................................... 345/174
See application file for complete search history.

(56) References Cited

U.S. PATENT DOCUMENTS

| | | | |
|---|---|---|---|
| 7,859,521 B2 | 12/2010 | Hotelling et al. | |
| 8,970,532 B2 | 3/2015 | Kim et al. | |
| 8,994,673 B2 | 3/2015 | Hwang et al. | |
| 9,098,134 B2 | 8/2015 | Lee et al. | |
| 9,201,533 B2 | 12/2015 | Kim et al. | |
| 9,250,735 B2 | 2/2016 | Kim et al. | |
| 2009/0085891 A1 | 4/2009 | Yang et al. | |
| 2010/0193257 A1* | 8/2010 | Hotelling ............. | G06F 3/0412 178/18.06 |

(Continued)

FOREIGN PATENT DOCUMENTS

| | | |
|---|---|---|
| CN | 102750024 A | 10/2012 |
| CN | 103164076 A | 6/2013 |

(Continued)

OTHER PUBLICATIONS

Communication dated Mar. 16, 2015 from the European Patent Office in counterpart European patent application No. 14191002.6-1972.

(Continued)

*Primary Examiner* — Yuzhen Shen
(74) *Attorney, Agent, or Firm* — Morgan, Lewis & Bockius LLP

(57) ABSTRACT

A touch sensor integrated type display device is disclosed. The device includes gate lines and data lines crossing the gate lines. It also includes pixel electrodes disposed in regions defined by crossings of the gate lines and the data lines. Further, the device includes common electrodes overlapping the pixel electrodes. The common electrodes include a group of first electrodes arranged in a first direction, and second electrodes disposed between the first electrodes and extending in a second direction substantially perpendicular to the first direction. The display device additionally includes first electrode connecting wires, each extending in the first direction and connected to a respective one of the first electrodes.

21 Claims, 10 Drawing Sheets

(56) References Cited

U.S. PATENT DOCUMENTS

| | | | |
|---|---|---|---|
| 2010/0194697 A1* | 8/2010 | Hotelling | G06F 3/0412 345/173 |
| 2012/0218199 A1 | 8/2012 | Kim et al. | |
| 2012/0268396 A1* | 10/2012 | Kim | G06F 3/0412 345/173 |
| 2012/0313881 A1* | 12/2012 | Ge | G02F 1/13338 345/174 |
| 2013/0147724 A1 | 6/2013 | Hwang et al. | |
| 2013/0176238 A1* | 7/2013 | Lo | G06F 3/044 345/173 |
| 2013/0241868 A1 | 9/2013 | Kim et al. | |
| 2013/0257774 A1 | 10/2013 | Kim et al. | |
| 2013/0257794 A1 | 10/2013 | Lee et al. | |
| 2014/0062943 A1* | 3/2014 | Choi | G06F 3/0412 345/174 |
| 2014/0071066 A1* | 3/2014 | Lee | G06F 3/0416 345/173 |
| 2014/0160066 A1 | 6/2014 | Kim et al. | |
| 2014/0306916 A1* | 10/2014 | Wang | G06F 3/041 345/173 |
| 2015/0085206 A1 | 3/2015 | Lee | |
| 2015/0085208 A1 | 3/2015 | Lee | |

FOREIGN PATENT DOCUMENTS

| | | |
|---|---|---|
| CN | 103364983 A | 10/2013 |
| CN | 103365461 A | 10/2013 |
| EP | 1 921 537 A2 | 5/2008 |
| EP | 2 214 084 A1 | 8/2010 |
| EP | 2 602 697 A2 | 6/2013 |
| EP | 2 645 211 A2 | 10/2013 |
| JP | 2013122752 A | 6/2013 |
| KR | 101318448 B1 | 10/2013 |
| TW | 201236127 A | 9/2012 |
| TW | M476310 | 4/2014 |

OTHER PUBLICATIONS

Communication dated Jan. 5, 2016 from the Japanese Patent Office in the counterpart Japanese patent application No. 2014-226982 (including English translation).
Taiwanese Office Action dated Mar. 16, 2016 from the Taiwanese Patent Office in the counterpart Taiwanese patent applicatino No. 103138217.
Chinese Office Action, dated Mar. 15, 2017, for the Chinese patent application No. 201410413074.8.

* cited by examiner

TOUCH SENSOR INTEGRATED TYPE DISPLAY DEVICE

This application claims the benefit of priority under 35 U.S.C. §119(a) to Korean Patent Application No. 10-2013-0146493 filed on Nov. 28, 2013, which is incorporated by reference herein in its entirety.

BACKGROUND OF THE INVENTION

Field of the Invention

The present invention relates to a touch sensor integrated type display device, and more particularly, to a touch sensor integrated type display device which is capable of recognizing a user's touch.

Discussion of the Related Art

Various input devices, such as a keyboard, a mouse, a trackball, a joystick, and a digitizer, have recently been used to configure an interface between users and home appliances or various kinds of information communication equipments. However, such input devices as a keyboard or a mouse require the user to learn to use them and take up space, thus making it difficult to improve the completeness of the products. Therefore, the demand for input devices that are more convenient and easier to use and reduce erroneous operations is growing more and more. In response to this growing demand, a touch sensor for enabling a user to input information by directly touching the screen with their hand or a pen was suggested.

The touch sensor is simple to use, has fewer malfunctions, and enables the user to input information without using an additional input device. In addition, the touch sensor can be applied to various display devices because it enables the user to operate it quickly and easily through contents displayed on the screen.

Touch sensors can be classified into an add-on type and an on-cell type. In the add-on type, a display device and a touch panel having a touch sensor are separately manufactured, and the touch panel is attached onto an upper substrate of the display device. In the on-cell type, a touch sensor is directly formed on the surface of an upper glass substrate of a display device.

The add-on type sensor has a structure in which the completed touch panel is mounted on the display device. It has various problems, such as an increased thickness and reduced visibility due to low brightness of the display device.

The on-cell type touch sensor has a structure in which a touch panel is formed on the upper surface of the display device and can have a reduced thickness compared to the add-on type. However, the on-cell type still has the problem of increasing the overall thickness of the display device due to a driving electrode layer, a sensing electrode layer, and an insulation layer for insulating the driving electrode layer and the sensing electrode layer which constitute the touch sensor. This may lead to increased manufacturing costs.

Accordingly, there is a need for a touch sensor integrated type display device capable of solving the problems of the related devices. A touch sensor integrated type display device like the one disclosed in U.S. Pat. No. 7,859,521 is known.

A touch sensor integrated type display device disclosed in U.S. Pat. No. 7,859,521 is able to recognize a touch and a touch position by measuring a change in mutual capacitance caused by touching because common electrodes for display are divided to serve as touch driving electrodes and touch sensing electrodes.

With this configuration, the touch driving electrodes and the touch sensing electrodes are each interconnected by wires according to their functions to avoid contact with different types of electrodes because both the touch driving electrodes and the touch sensing electrodes are formed on the same layer. That is, the touch driving electrodes are connected together through contact holes by touch driving wires, and the touch sensing electrodes are connected together through contact holes by touch sensing wires. This prevents contact between the touch driving electrodes and the touch sensing electrodes.

However, the related art touch sensor integrated type display device has a problem of low aperture ratio because the touch driving wires and the touch sensing wires cross each other in a display area of the display device.

Moreover, the recent increase in the size of display devices has resulted in greater differences in the RC delay (resistance capacitor delay) of the touch driving electrodes depending on their respective positions on a display panel, which in turn resulted in a decreased uniformity of a touch driving signal or touch sensing signal.

FIG. 1 is a view illustrating the decreasing signal uniformity with the increasing size of a display device. As can be seen from FIG. 1, a touch driving pulse Sp has a normal waveform at the input terminal of a display panel DP but a distorted waveform at the far end of the display panel. Also, a sensing signal Ss has a normal waveform near the input terminal but a distorted waveform at the far end. These differences in the waveform make accurate touch sensing more difficult.

SUMMARY OF THE INVENTION

Accordingly, the present invention is directed to a touch sensor integrated type display device that substantially obviates one or more of the problems due to limitations and disadvantages of the related art.

An object of the present invention is to provide a touch sensor integrated type display device which makes the formation of complex wires for touch driving electrodes and touch sensing electrodes easy and efficient. For example, each touch driving electrode or each touch sensing electrode can be formed to correspond to each pixel electrode, touch driving electrode connecting wires can be formed concurrently with gate lines, and each touch sensing electrode connecting wire can be formed to correspond to each data line.

Another object of the present invention is to provide a touch sensor integrated type display device which can improve the precision and accuracy of touch recognition by feeding a touch driving voltage to touch driving electrodes without attenuation of a touch driving signal. For example, the mutual capacitance between neighboring touch driving electrode connecting wires can be maintained substantially the same by means of dummy wires. Also, a touch driving voltage can be fed from both sides of the display device through touch driving electrode connecting wires located on the left and right sides of the display device to reduce the length of the touch driving electrode connecting wires.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a touch sensor integrated type display device includes: a plurality of gate lines and a plurality of data lines crossing the gate lines; a plurality of pixel electrodes disposed in regions defined by crossings of the gate lines and the data lines; a plurality of common electrodes overlapping the pixel electrodes, the common electrodes comprising a first group of first electrodes arranged in a first direction, and a plurality of second electrodes disposed between the first electrodes and extending in a second direction substantially perpendicular to the first direction; and a plurality of first electrode connecting wires, each extending in the first direction and connected to a respective one of the first electrodes.

In another aspect of the present invention, a touch sensor integrated type display device includes: a substrate; a plurality of gate lines and a plurality of first electrode connecting wires over the substrate, the first electrode connecting wires extending in a first direction; a gate insulation film over the gate lines and the first electrode connecting wires; a plurality of data lines over the gate insulation film and crossing the gate lines; a plurality of thin film transistors formed near crossings of the data lines and the gate lines, each of the thin film transistors including a drain formed over the gate insulation film; a first passivation film over the thin film transistors, the data lines, and the gate insulation film; and a plurality of common electrodes over the first passivation film, the common electrodes including a plurality of first electrodes arranged in the first direction and a plurality of second electrodes disposed between the first electrodes and extending in a second direction substantially perpendicular to the first direction, wherein each of the first electrodes is connected to a respective one of the first electrode connecting wires via a first contact hole through the gate insulation film and the first passivation film.

In yet another aspect of the present invention, a touch sensor integrated type display device includes: a substrate; a plurality of gate lines and a plurality of first electrode connecting wires over the first substrate, the first electrode connecting wires extending in a first direction; a gate insulation film over the gate lines and the first electrode connecting wires; a plurality of data lines over the gate insulation film and crossing the gate lines; a plurality of thin film transistors formed near crossings of the data lines and the gate lines, each of the thin film transistors including a drain formed over the gate insulation film; a first passivation film over the thin film transistors, the data lines, and the gate insulation film; a plurality of pixel electrodes over the first passivation film, each of the pixel electrodes being connected to a drain of a respective one of the thin film transistors via a first contact hole through the first passivation film; a second passivation film over the pixel electrodes; and a plurality of common electrodes over the second passivation film, the common electrodes including a plurality of first electrodes arranged in the first direction and a plurality of second electrodes disposed between the first electrodes and extending in a second direction substantially perpendicular to the first direction, wherein each of the first electrodes is connected to a respective one of the first electrode connecting wires via a second contact hole through the gate insulation film, the first passivation film, and the second passivation film.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
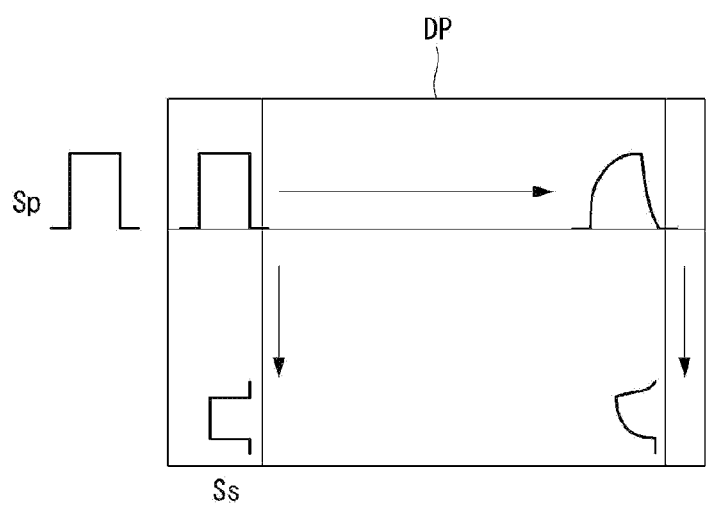
FIG. 1 is a view for illustrating the decreasing signal uniformity with the increasing size of a display device.

Hereinafter, exemplary embodiments of the present invention will be described in detail with reference to the attached drawings. Throughout the specification, the same reference numerals indicate substantially the same components.

Figure 2:
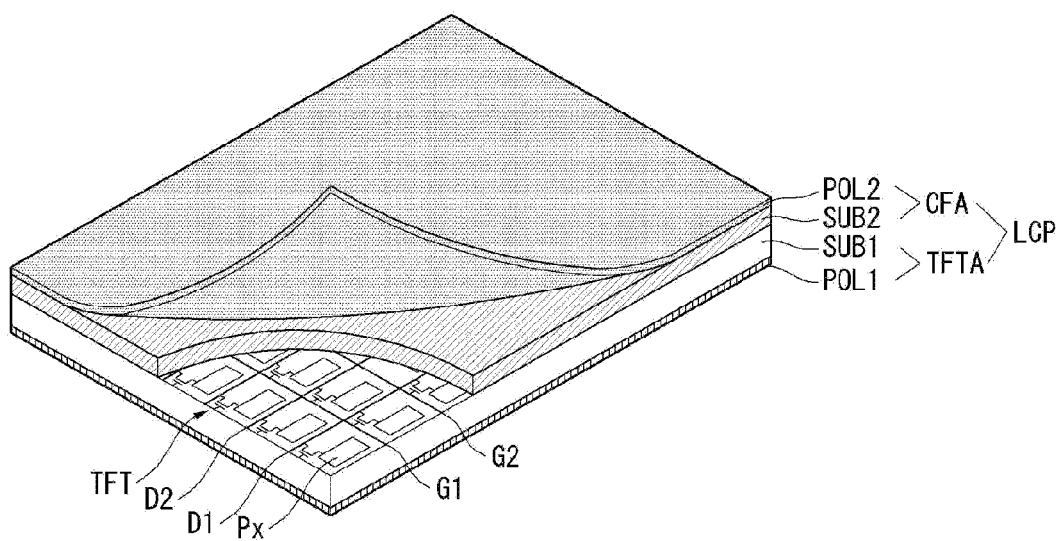
FIG. 2 is a partial exploded perspective view schematically showing a touch sensor integrated type display device according to example embodiments of the present invention.
Figure 3:
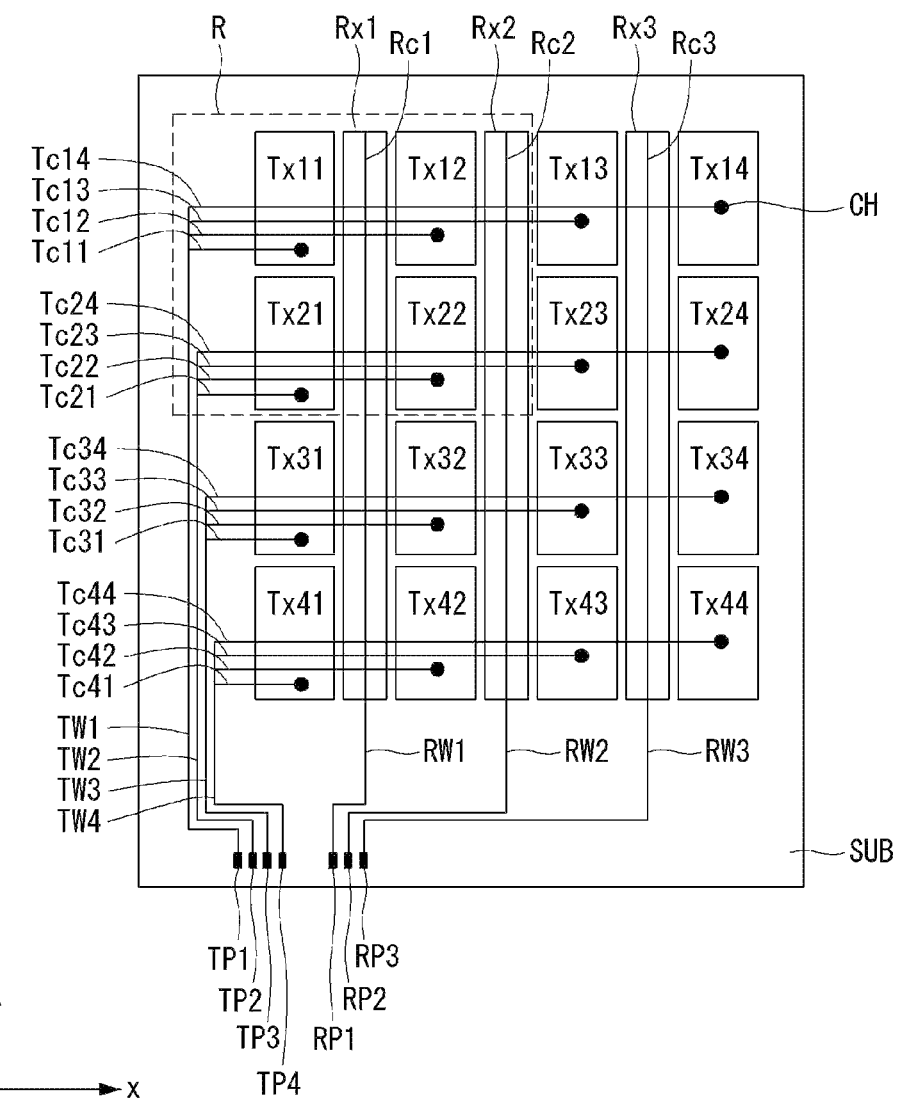
FIG. 3 is a top plan view schematically illustrating a touch sensor integrated type display device according to a first example embodiment of the present invention.

First, a touch sensor integrated type display device according to an example embodiment of the present invention will be described with reference to FIGS. 2 and 3. FIG. 2 is a partial exploded perspective view schematically showing a touch sensor integrated type display device according to example embodiments of the present invention. FIG. 3 is a top plan view schematically illustrating a touch sensor integrated type display device according to a first example embodiment of the present invention.

As shown in FIG. 2, a touch sensor integrated type display device according to example embodiments of the present invention comprises a liquid crystal display panel LCP having a thin film transistor array TFTA and a color filter array CFA, with a liquid crystal layer (not shown) interposed between them.

The thin film transistor array TFTA comprises a plurality of gate lines, including G1 and G2, formed in parallel on a first substrate SUB1 in a first direction (e.g., x-axis direction), and a plurality of data lines, including D1 and D2, formed in parallel in a second direction (e.g., y-axis direction) so as to cross the plurality of data lines G1 and G2. The thin film transistor array TFTA also includes liquid crystal cells positioned in areas defined by the crossings of the gate lines (e.g., G1 and G2) and the data lines (e.g., D1 and D2), thin film transistors TFT formed at the crossings of the gate lines and the data lines, a plurality of pixel electrodes Px for charging a data voltage in liquid crystal cells, and common electrodes (not shown) located to form an electric field with the pixel electrodes Px.

The color filter array CFA comprises a black matrix BM and color filters (not shown) which are formed on a second substrate SUB2. Polarizers POL1 and POL2 are respectively attached to the outer surfaces of the first substrate SUB1 and second substrate SUB2 of the liquid crystal display panel LCP. An alignment film (not shown) for setting a pretilt angle of liquid crystals is formed on the inner surfaces of the first and second substrates SUB1 and SUB2 facing the liquid crystal cells. A column spacer for maintaining a cell gap of the liquid crystal cells may be formed between the color filter array CFA and the thin film transistor array TFTA of the liquid crystal display panel LCP.

The common electrodes may be formed on the second substrate SUB2 in a vertical electric field driving method, such as a twisted nematic (TN) mode or a vertical alignment (VA) mode. Alternatively, the common electrodes may be formed on the first substrate SUB1 together with the pixel electrodes Px in a horizontal electric field driving method, such as an in-plane switching (IPS) mode or a fringe field switching (FFS) mode. The example embodiments of the present invention will be described below with respect to the horizontal electric field driving method.

As shown in FIG. 3, the common electrodes COM of the touch sensor integrated type display device according to the first example embodiment of the present invention include a plurality of electrodes Tx11 to Tx14, Tx21 to Tx24, Tx31 to Tx34, Tx41 to Tx44, and Rx1 to Rx3 that are divided in a first direction (x-axis direction) and a second direction (y-axis direction). These electrodes serve as both touch driving electrodes and touch sensing electrodes which constitute a touch sensor.

More specifically, among the electrodes Tx11 to Tx14, Tx21 to Tx24, Tx31 to Tx34, Tx41 to Tx44, and Rx1 to Rx3, the electrodes of the first to fourth rows arranged in the x-axis direction constitute the first to fourth touch driving electrode groups Tx11 to Tx14, Tx21 to Tx24, Tx31 to Tx34, and Tx41 to Tx44, and the electrodes of the first to third columns arranged in the y-axis direction constitute the first to third touch sensing electrodes Rx1 to Rx3.

At least one touch driving electrode is located for each row (Tx11, Tx12, Tx13, and Tx14 for the first row, for example) between neighboring touch sensing electrodes Rx1 and Rx2, and between Rx2 and Rx3. Alternatively, at least one touch driving electrode is located for each row between the neighboring touch sensing electrodes Rx1 and Rx2, and between Rx2 and Rx3. and at outer side of at least one of the outermost touch sensing electrode Rx1, Rx3.

The 1-1 touch driving electrode Tx11 of the first touch driving electrode group Tx11 to Tx14 is connected to a 1-1 touch driving electrode connecting wire Tc11 arranged in parallel with the first touch driving electrode group Tx11 to Tx14. The 1-2 touch driving electrode Tx12 is connected to a 1-2 touch driving electrode connecting wire Tc12 arranged in parallel with the first touch driving electrode group Tx11 to Tx14. The 1-3 touch driving electrode Tx13 is connected to a 1-3 touch driving electrode connecting wire Tc13 arranged in parallel with the first touch driving electrode group Tx11 to Tx14. And the 1-4 touch driving electrode Tx14 is connected to a 1-4 touch driving electrode connecting wire Tc14 arranged in parallel with the first touch driving electrode group Tx11 to Tx14.

The 1-1 to 1-4 touch driving electrode connecting wires Tc11 to Tc14 are arranged parallel to one another, and arranged as shown in FIG. 3. The 1-1 to 1-4 touch driving electrode connecting wires Tc11 to Tc14 are interconnected by a first touch driving routing wire Tw1 on the outside of the active area where the touch driving electrodes Tx11 to Tx14, Tx21 to Tx24, Tx31 to Tx34, and Tx41 to Tx44 and the touch sensing electrodes Rx1 to Rx3 are formed. The first touch driving routing wire TW1 is connected to a first touch driving pad TP1 for feeding a touch driving voltage from a power supply part (not shown) to the first touch driving electrode group T11 to Tx14.

The 2-1 touch driving electrode Tx21 of the second touch driving electrode group Tx21 to Tx24 is connected to a 2-1 touch driving electrode connecting wire Tc21 arranged in parallel with the second touch driving electrode group Tx21 to Tx24. The 2-2 touch driving electrode Tx22 is connected to a 2-2 touch driving electrode connecting wire Tc22 arranged in parallel with the second touch driving electrode group Tx21 to Tx24. The 2-3 touch driving electrode Tx23 is connected to a 2-3 touch driving electrode connecting wire Tc23 arranged in parallel with the second touch driving electrode group Tx21 to Tx24. And the 2-4 touch driving electrode Tx24 is connected to a 2-4 touch driving electrode connecting wire Tc24 arranged in parallel with the second touch driving electrode group Tx21 to Tx24.

The 2-1 to 2-4 touch driving electrode connecting wires Tc21 to Tc24 are arranged parallel to one another, and arranged as shown in FIG. 3. The 2-1 to 2-4 touch driving electrode connecting wires Tc21 to Tc24 are interconnected by a second touch driving routing wire Tw2 on the outside of the active area where the touch driving electrodes Tx11 to Tx14, Tx21 to Tx24, Tx31 to Tx34, and Tx41 to Tx44 and the touch sensing electrodes Rx1 to Rx3 are formed. The second touch driving routing wire TW2 is connected to a second touch driving pad TP2 for feeding a touch driving voltage from a power supply part (not shown) to the second touch driving electrode group T21 to Tx24.

The 3-1 touch driving electrode Tx31 of the third touch driving electrode group Tx31 to Tx34 is connected to a 3-1 touch driving electrode connecting wire Tc31 arranged in parallel with the third touch driving electrode group Tx31 to Tx34. The 3-2 touch driving electrode Tx32 is connected to a 3-2 touch driving electrode connecting wire Tc32 arranged in parallel with the third touch driving electrode group Tx31 to Tx34. The 3-3 touch driving electrode Tx33 is connected to a 3-3 touch driving electrode connecting wire Tc33 arranged in parallel with the third touch driving electrode group Tx31 to Tx34. And the 3-4 touch driving electrode Tx34 is connected to a 3-4 touch driving electrode connecting wire Tc34 arranged in parallel with the third touch driving electrode group Tx31 to Tx34.

The 3-1 to 3-4 touch driving electrode connecting wires Tc31 to Tc34 are arranged parallel to one another, and arranged as shown in FIG. 3. The 3-1 to 3-4 touch driving electrode connecting wires Tc31 to Tc34 are interconnected by a third touch driving routing wire Tw3 on the outside of the active area where the touch driving electrodes Tx11 to Tx14, Tx21 to Tx24, Tx31 to Tx34, and Tx41 to Tx44 and the touch sensing electrodes Rx1 to Rx3 are formed. The third touch driving routing wire TW3 is connected to a third touch driving pad TP3 for feeding a touch driving voltage from a power supply part (not shown) to the third touch driving electrode group T31 to Tx34.

The 4-1 touch driving electrode Tx41 of the fourth touch driving electrode group Tx41 to Tx44 is connected to a 4-1 touch driving electrode connecting wire Tc41 arranged in parallel with the fourth touch driving electrode group Tx41 to Tx44. The 4-2 touch driving electrode Tx42 is connected to a 4-2 touch driving electrode connecting wire Tc42 arranged in parallel with the fourth touch driving electrode group Tx41 to Tx44. The 4-3 touch driving electrode Tx43 is connected to a 4-3 touch driving electrode connecting wire Tc43 arranged in parallel with the fourth touch driving electrode group Tx41 to Tx44. And the 4-4 touch driving electrode Tx44 is connected to a 4-4 touch driving electrode connecting wire Tc44 arranged in parallel with the fourth touch driving electrode group Tx41 to Tx44.

The 4-1 to 4-4 touch driving electrode connecting wires Tc41 to Tc44 are arranged parallel to one another, and arranged as shown in FIG. 3. The 4-1 to 4-4 touch driving electrode connecting wires Tc41 to Tc44 are interconnected by a fourth touch driving routing wire Tw4 on the outside of the active area where the touch driving electrodes Tx11 to Tx14, Tx21 to Tx24, Tx31 to Tx34, and Tx41 to Tx44 and the touch sensing electrodes Rx1 to Rx3 are formed. The fourth touch driving routing wire TW4 is connected to a fourth touch driving pad TP4 for feeding a touch driving voltage from a power supply part (not shown) to the fourth touch driving electrode group T41 to Tx44.

The touch driving electrodes Tx11 to Tx14, Tx21 to Tx24, Tx31 to Tx34, and Tx41 to Tx44 are respectively connected to the touch driving electrode connecting wires Tc11 to Tc14, Tc21 to Tc24, Tc31 to Tc34, and Tc41 to Tc44 via contact holes CH.

The first touch sensing electrode Rx1 is connected to the first touch sensing electrode connecting wire Rc1 arranged in parallel with the first touch sensing electrode Rx1. The first touch sensing electrode connecting wire Rc1 is connected to the first touch sensing routing wire RW1 on the outside of the active area where the touch driving electrodes Tx11 to Tx14, Tx21 to Tx24, Tx31 to Tx34, and Tx41 to Tx44 and the touch sensing electrodes Rx1 to Rx3 are formed. The first touch sensing routing wire RW1 is connected to a first touch sensing pad RP1 for feeding a sensing signal to a touch processor (not shown).

The second touch sensing electrode Rx2 is connected to the second touch sensing electrode connecting wire Rc2 arranged in parallel with the second touch sensing electrode Rx2. The second touch sensing electrode connecting wire Rc2 is connected to the second touch sensing routing wire RW2 on the outside of the active area where the touch driving electrodes Tx11 to Tx14, Tx21 to Tx24, Tx31 to Tx34, and Tx41 to Tx44 and the touch sensing electrodes Rx1 to Rx3 are formed. The second touch sensing routing wire RW2 is connected to a second touch sensing pad RP2 for feeding a sensing signal to the touch processor (not shown).

The third touch sensing electrode Rx3 is connected to the third touch sensing electrode connecting wire Rc3 arranged in parallel with the third touch sensing electrode Rx3. The third touch sensing electrode connecting wire Rc3 is connected to the third touch sensing routing wire RW3 on the outside of the active area where the touch driving electrodes Tx11 to Tx14, Tx21 to Tx24, Tx31 to Tx34, and Tx41 to Tx44 and the touch sensing electrodes Rx1 to Rx3 are formed. The third touch sensing routing wire RW3 is connected to a third touch sensing pad RP3 for feeding a sensing signal to the touch processor (not shown).

The touch driving electrodes Tx11 to Tx14, Tx21 to Tx24, Tx31 to Tx34, and Tx41 to Tx44 and the touch sensing electrodes Rx1 to Rx3 may be formed of transparent conductive material, such as ITO (indium tin oxide), IZO (indium zinc oxide), or GZO (gallium-doped zinc oxide). The first to fourth touch driving electrode connecting wires Tc11 to Tc14, Tc21 to Tc24, Tc31 to Tc34, and Tc41 to Tc44, the first to fourth touch driving routing wires TW1 to TW4, the first to third touch sensing electrode connecting wires Rc1 to Rc3, and the first to third touch sensing routing wires RW1 to RW3 may be formed of metal material, such as Al, AlNd, Mo, MoTi, Cu, Cr, Ag, or Ag-based alloys.

The first to third touch sensing electrode connecting wires Rc1 to Rc3 are arranged in parallel with the first to third touch sensing electrodes Rx1 to Rx3, and connected to the first to third touch sensing electrodes Rx1 to Rx3, respectively. This can reduce the resistance of the first to third touch sensing electrodes Rx1 to Rx3, which are made of a high-resistive transparent conductive material.

Figure 4:
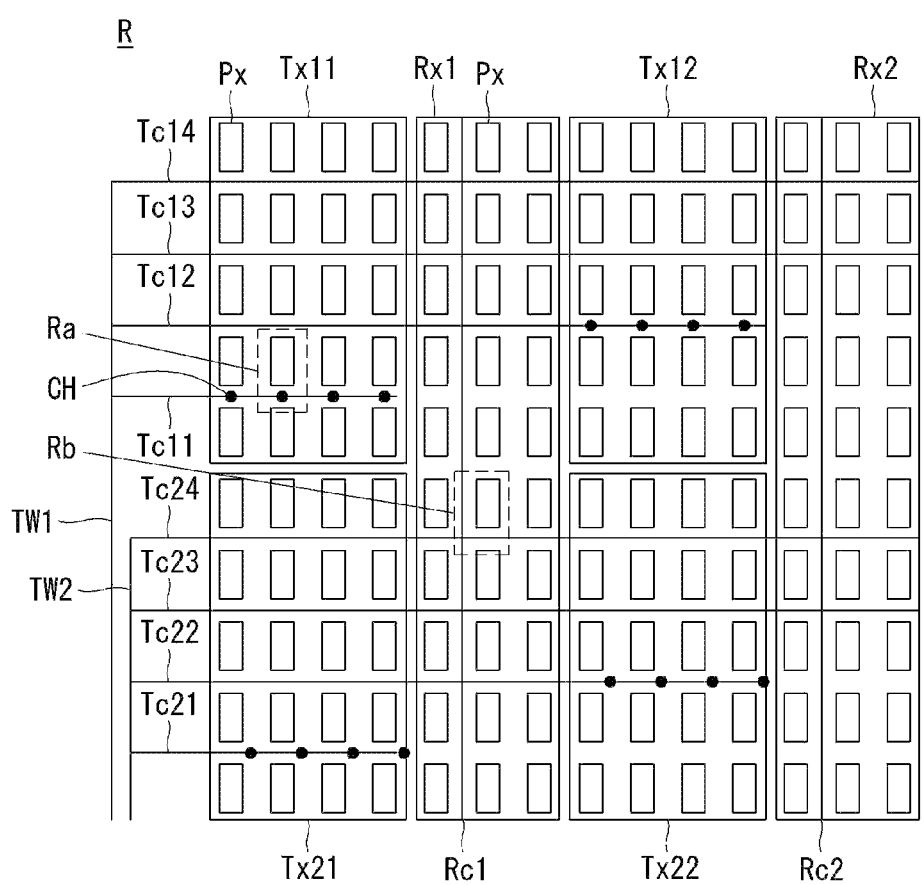
FIG. 4 is a top plan view schematically illustrating the relationship between the common electrodes (the touch driving electrodes and the touch sensing electrodes) and the pixel electrodes in the region R shown in FIG. 3.

Next, the relationship between the common electrodes (the touch driving electrodes and the touch sensing electrodes) and the pixel electrodes will be described in more detail with reference to FIG. 4. FIG. 4 is a top plan view schematically illustrating the relationship between the common electrodes (the touch driving electrodes and the touch sensing electrodes) and the pixel electrodes in the region R shown in FIG. 3.

As shown in FIG. 4, a plurality of pixel electrodes Px are located in correspondence to the touch driving electrodes Tx11 to Tx14, Tx21 to Tx24, Tx31 to Tx34, and Tx41 to Tx44 and the touch sensing electrodes Rx1 to Rx3.

For example, a plurality of pixel electrodes Px are located in correspondence to the touch driving electrodes Tx11 to Tx14, Tx21 to Tx24, Tx31 to Tx34, and Tx41 to Tx44, with the first to fourth touch driving electrode wires Tc14 to Tc11, Tc24 to Tc21, Tc34 to Tc31, and Tc44 to Tc41 interposed between the pixel electrodes Px, as shown in FIG. 4. The first to fourth touch driving electrode wires Tc14 to Tc11, Tc24 to Tc21, Tc34 to Tc31, and Tc44 to Tc41 are located in proximity to the gate lines GL for driving the pixel electrodes Px of the display device.

A plurality of pixel electrodes Px are located at the touch sensing electrodes Rx1 to Rx3, with the first to fourth touch driving electrode wires Tc14 to Tc11, Tc24 to Tc21, Tc34 to Tc31, and Tc44 to Tc41 and the first to third touch sensing electrode connecting wires Rc1 to Rc3 interposed between the pixel electrodes Px. The first to fourth touch driving electrode wires Tc14 to Tc11, Tc24 to Tc21, Tc34 to Tc31, and Tc44 to Tc41 are located in proximity to the gate lines GL for driving the pixel electrodes Px of the display device. The first to third touch sensing electrode connecting wires Rc1 to Rc3 are located corresponding to the data lines DL for feeding a data voltage to the pixel electrodes of the display device. Each of the first to third touch sensing electrode connecting wires Rc1 to Rc3 does not need to correspond to each of the data lines DL, but instead may correspond to several or several tens of data lines DL.

Disposing the first to third touch sensing electrode connecting wires Rc1 to Rc3 to overlap with the data lines DL can achieve the benefit of preventing the first to third touch sensing electrode connecting wires Rc1 to Rc3 from causing a decrease in aperture ratio.

Figure 5A:
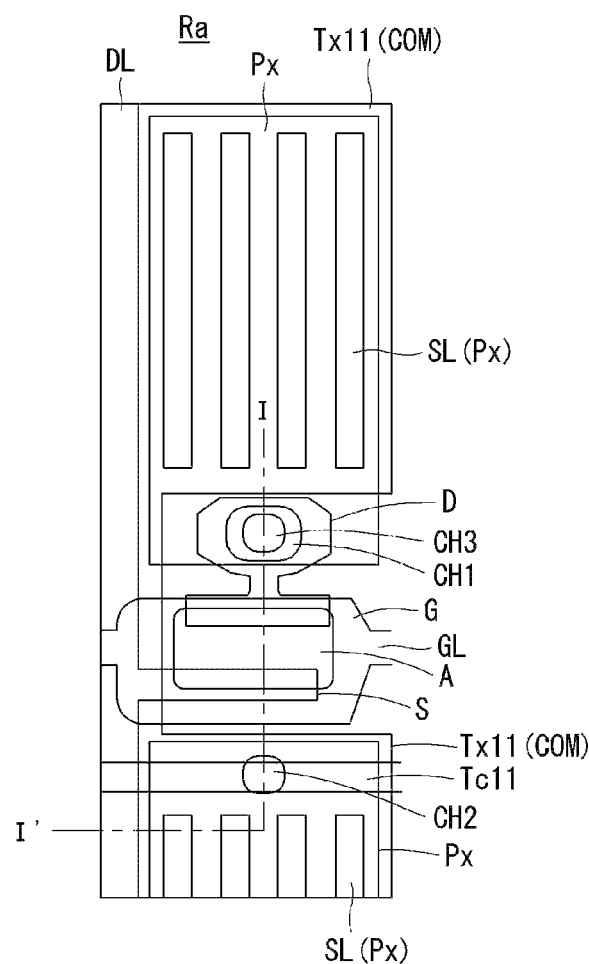
FIG. 5A is a top plan view illustrating the region Ra shown in FIG. 4 when the pixel electrodes are formed over the common electrodes.
Figure 5B:
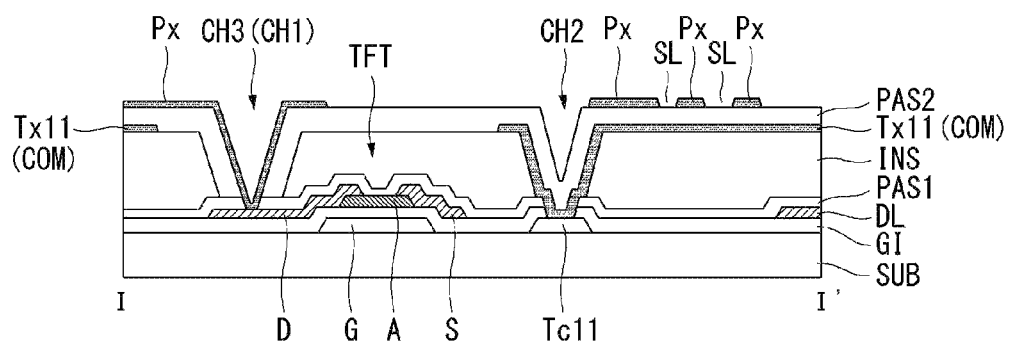
FIG. 5B is a cross-sectional view taken along the line I-I' of FIG. 5A.
Figure 6A:
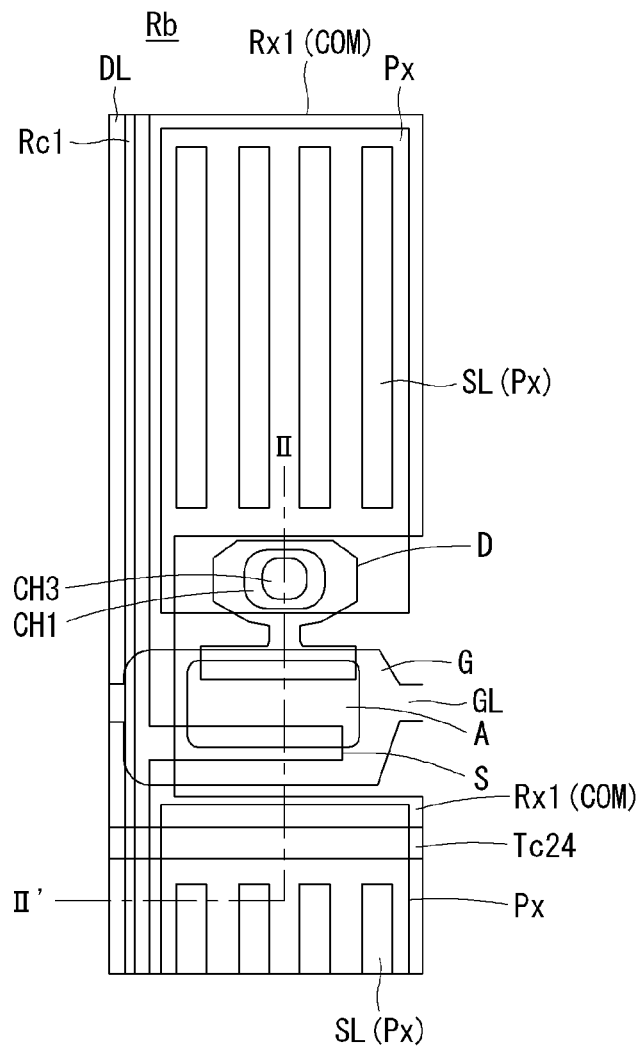
FIG. 6A is a top plan view illustrating the region Rb shown in FIG. 4 when the pixel electrodes are formed over the common electrodes.
Figure 6B:
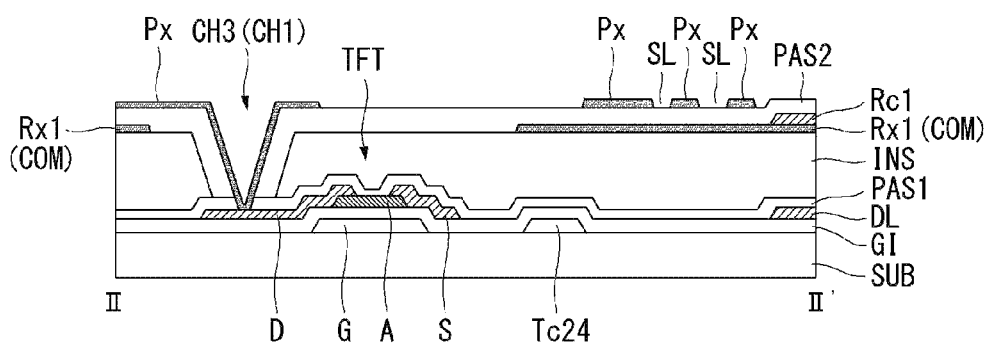
FIG. 6B is a cross-sectional view taken along the line II-II' of FIG. 6A.

Next, the touch sensor integrated type display device according to the first example embodiment of the present invention will be described with reference to FIG. 4 and to FIGS. 5A to 6B which illustrate an example where the pixel electrodes are formed over the common electrodes (the touch driving electrodes and the touch sensing electrodes). FIG. 5A is a top plan view illustrating the region Ra shown in FIG. 4 in an example where the pixel electrodes are formed over the common electrodes. FIG. 5B is a cross-sectional view taken along the line I-I' of FIG. 5A. FIG. 6A is a top plan view illustrating the region Rb shown in FIG. 4 in an example where the pixel electrodes are formed over the common electrodes. FIG. 6B is a cross-sectional view taken along the line II-II' of FIG. 6A.

For the sake of simplicity, the following description will be provided based on one example pixel electrode Px corresponding to a region (Ra) of one touch driving electrode Tx11 and on one example electrode Px corresponding to a region (Rb) of one touch sensing electrode Rx1.

As shown in FIG. 4 and FIGS. 5A to 6B, the touch sensor integrated type display device according to the first example embodiment of the present invention comprises gate lines GL and data lines DL formed to cross each other on a substrate SUB of a thin film transistor array TFTA, thin film transistors TFT formed at the crossings of the gate lines GL and the data lines DL, pixel electrodes Px formed in regions defined by the crossings of two neighboring gate lines GL and two neighboring data lines DL, and common electrodes COM facing the pixel electrodes Px. The common electrodes COM according to the first example embodiment of the present invention also serve as touch driving electrodes Tx and touch sensing electrodes Rx. Accordingly, in the following description, the common electrodes will be hereinafter referred to in various terms, such as common electrodes COM, common electrodes also serving as touch driving electrodes, touch driving electrodes Tx, touch sensing electrodes Rx, common electrodes COM also serving as touch driving electrodes Tx, or common electrodes COM also serving as touch sensing electrodes Rx as the case may be.

With this configuration, a gate line GL and the touch driving electrode connecting wire Tc11 are formed in parallel and separated from each other on the substrate SUB. A gate insulation film GI is formed over the gate line GL and the touch driving electrode connecting wire Tc11. An active layer A, a source electrode S, and a drain electrode D are respectively formed on the gate insulation film GI to constitute a thin film transistor TFT. A data line DL may also be formed concurrently with the source and drain electrodes S and D over the gate insulation film GI.

That is, the thin film transistor TFT comprises a gate electrode G formed on the substrate SUB and extending from a gate line GL, an active layer A formed corresponding to the gate electrode G on the gate insulation film GI that covers the gate line GL and the gate electrode G, and source and drain electrodes S and D separated from each other to partially expose the active layer A. One of the source and drain electrodes S and D (in this example, the source electrode S) extends from a data line DL.

Although the above example embodiment has been described taking as an example a thin film transistor having a bottom gate structure where the gate electrode is formed under the source/drain electrodes, the present invention is not limited to this example structure, but is also applicable to a thin film transistor having a top gate structure where the gate electrode is formed over the source/drain electrodes. The thin film transistor having a top gate structure is well-known, and a detailed description thereof will be omitted.

A first passivation film PAS1 covering the thin film transistor TFT and the data line DL is formed over the gate insulation film GI where the thin film transistor TFT and the data line DL are formed. An organic insulation film INS, such as photoacryl, is formed on the first passivation film PAS1 for planarization. A first contact hole CH1 exposing part of the drain electrode D is formed through the first passivation film PAS1 and the organic insulation film INS. A second contact hole CH2 exposing part of the touch driving electrode connecting wire Tc11 is formed through the gate insulation film GI, the first passivation film PAS1, and the organic insulation film INS.

As shown in FIGS. 5B and 6B, a touch driving electrode Tx11 and a touch sensing electrode Rx1, which also serve as common electrodes, are formed on the organic insulation film INS. The touch driving electrode Tx11 is connected to the touch driving electrode connecting wire Tc11 via the second contact hole CH2.

A touch sensing electrode connecting wire Rc1 is formed on the touch sensing electrode Rx1 along the arrangement direction (y-axis direction) of the touch sensing electrode Rx1 to come into contact with the touch sensing electrode Rx1. If the touch sensing electrode connecting wire Rc1 overlaps with the data line DL, the touch sensing electrode connecting wire Rc1 can prevent a decrease in the aperture ratio.

A second passivation film PAS2 is formed over the entire surface of the organic insulation film INS, including where the touch driving electrode Tx11, the touch sensing electrode Rx1, and the touch sensing electrode connecting wire Rc1 are formed. A third contact hole CH3 partially exposing the drain electrode D penetrates the second passivation film PAS2 and the first passivation film PAS1.

A pixel electrode Px is formed on the second passivation film PAS2, including in the third contact hole CH3, so as to be connected to the drain electrode D via the third contact hole CH3 and to overlap the touch driving electrode Tx11 or the touch sensing electrode Rx1. The pixel electrode Px comprises a plurality of slits SL to facilitate the formation of a horizontal electric field between the common electrode also serving as the touch driving electrode Tx11 (COM) and the common electrode also serving as the touch sensing electrode Rx1 (COM). Accordingly, while the touch driving electrode Tx and touch sensing electrode Rx formed on the organic insulation layer INS have no slits, the pixel electrode Px formed on the second passivation film PAS2 has slits.

As described above, the first to fourth touch driving electrode groups Tx11 to Tx14, Tx21 to Tx24, Tx31 to Tx34, and Tx41 to Tx44 according to the first example embodiment of the present invention are respectively connected to the first to fourth touch driving electrode connecting wires Tc11 to Tc14, Tc21 to Tc24, Tc31 to Tc34, and Tc41 to Tc44, which form four touch driving lines in the x-axis direction and are in turn respectively connected to four touch driving routing wires TW1 to TW4. The touch sensing electrodes Rx1 to Rx3 are respectively connected to touch sensing electrode connecting wires Rc1 to Rc3, which form touch sensing lines in the y-axis direction. The first to fourth touch driving electrode connecting wires Tc11 to Tc14, Tc21 to Tc24, Tc31 to Tc34, and Tc41 to Tc44 and the first to third touch sensing electrode connecting wires Rc1 to Rc3 cross one another as shown in FIG. 3. Accordingly, when the display device is touched, this causes a change in a mutual capacitance between the touch sensing lines and the touch driving lines. The position where the change in mutual capacitance occurs can be detected by measuring this change.

Figure 7A:
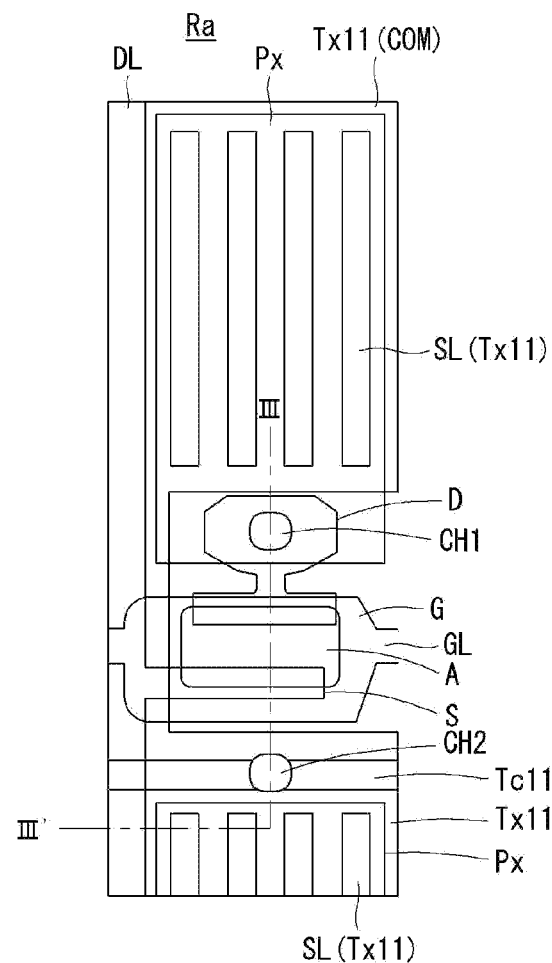
FIG. 7A is a top plan view illustrating the region Ra shown in FIG. 4 when the common electrodes are formed over the pixel electrodes.
Figure 7B:
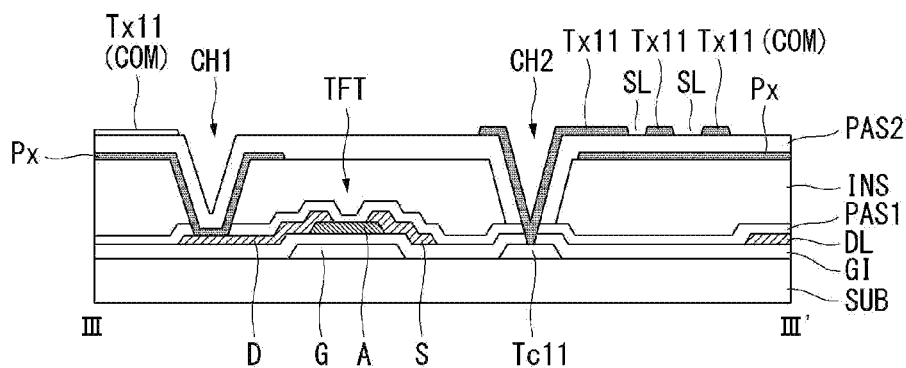
FIG. 7B is a cross-sectional view taken along the line III-III' of FIG. 7A.
Figure 8A:
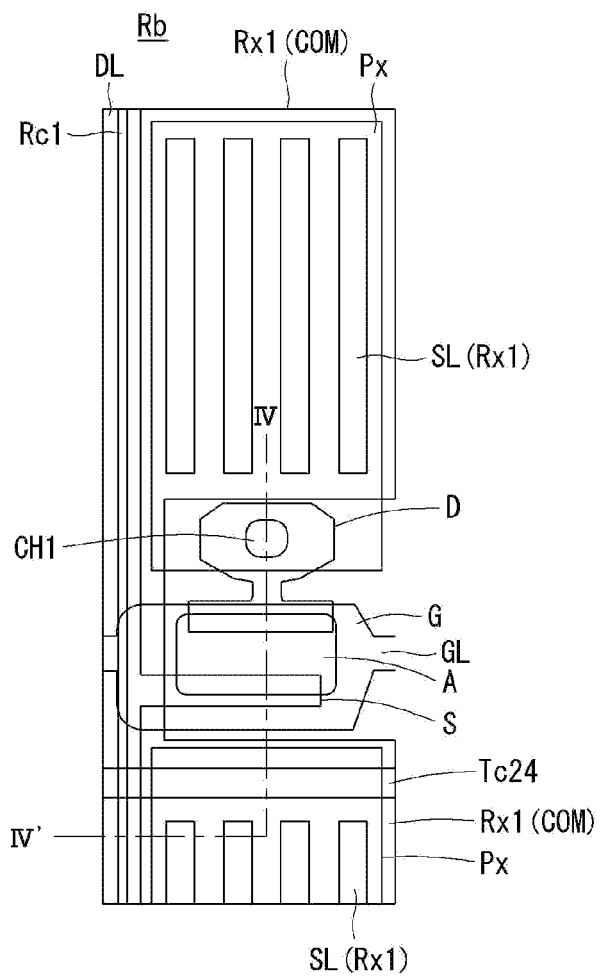
FIG. 8A is a top plan view illustrating the region Rb shown in FIG. 4 when the common electrodes are formed over the pixel electrodes.
Figure 8B:
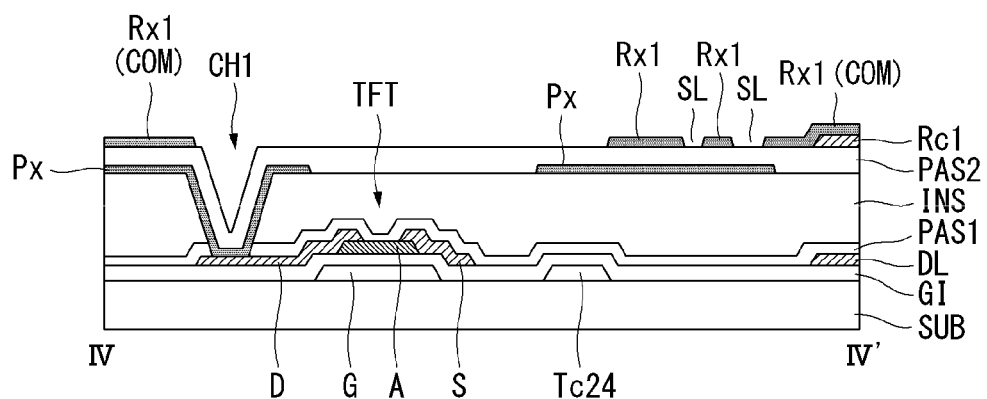
FIG. 8B is a cross-sectional view taken along the line IV-IV' of FIG. 8A.

Next, the touch sensor integrated type display device according to a modification of the first example embodiment of the present invention will be described with reference to FIG. 4 and to FIGS. 7A to 8B which illustrate an example where the common electrodes (i.e., the touch driving electrodes and the touch sensing electrodes) are formed over the pixel electrodes. FIG. 7A is a top plan view illustrating the region Ra shown in FIG. 4 when the common electrodes are formed over the pixel electrodes. FIG. 7B is a cross-sectional view taken along the line III-III' of FIG. 7A. FIG. 8A is a top plan view illustrating the region Rb shown in FIG. 4 when the common electrodes are formed over the pixel electrodes. FIG. 8B is a cross-sectional view taken along the line IV-IV' of FIG. 8A.

For the sake of simplicity, the following description will be provided based on one example pixel electrode Px corresponding to a region (Ra) of one touch driving electrode Tx11 and on one example pixel electrode Px corresponding to a region (Rb) of one touch sensing electrode Rx1.

As shown in FIG. 4 and FIGS. 7A to 8B, the touch sensor integrated type display device according to the modified first example embodiment of the present invention comprises gate lines GL and data lines DL formed to cross each other on a substrate SUB of a thin film transistor array TFTA, thin film transistors TFT formed at the crossings of the gate lines GL and the data lines DL, pixel electrodes Px formed in regions defined by the crossings of two neighboring gate lines GL and two neighboring data lines DL, and common electrodes COM facing the pixel electrodes Px. The touch sensor integrated type display device according to the modified first example embodiment of the present invention is different from the touch sensor integrated type display device according to the first example embodiment of the present invention in that the common electrodes COM (i.e., the touch driving electrodes Tx and the touch sensing electrodes Rx) are formed over the pixel electrodes, instead of vice verse.

The common electrodes COM according to the modified first example embodiment of the present invention also serve as touch driving electrodes Tx and touch sensing electrodes Rx. Accordingly, in the following description, the common electrodes will be hereinafter referred to in various terms, such as common electrodes COM, common electrodes also serving as touch driving electrodes, touch driving electrodes Tx, touch sensing electrodes Rx, common electrodes COM also serving as touch driving electrodes Tx, or common electrodes COM also serving as touch sensing electrodes Rx as the case may be.

With this configuration, a gate line GL and the touch driving electrode connecting wire Tc11 are formed in parallel and separated from each other on the substrate SUB. A gate insulation film GI is formed over the gate line GL and the touch driving electrode connecting wire Tc11. An active layer A, a source electrode S, and a drain electrode D are respectively formed on the gate insulation film GI to constitute a thin film transistor TFT. A data line DL may also be formed concurrently with the source and drain electrodes S and D over the gate insulation film GI.

That is, the thin film transistor TFT comprises a gate electrode G formed on the substrate SUB and extending from a gate line GL, an active layer A formed corresponding to the gate electrode G on the gate insulation film GI that covers the gate line GL and the gate electrode G, and source and drain electrodes S and D separated from each other to partially expose the active layer A. One of the source and drain electrodes S and D (in this example, the source electrode S) extends from a data line DL.

Like the first example embodiment, the thin film transistor according to the modified first example embodiment may be a thin film transistor having a bottom gate structure or a top gate structure.

A first passivation film PAS1 covering the thin film transistor TFT and the data line DL is formed over the gate insulation film GI where the thin film transistor TFT and the data line DL are formed. An organic insulation film INS, such as photoacryl, is formed on the first passivation film PAS1 for planarization. A first contact hole CH1 partially exposing the drain electrode D is formed through the organic insulation film INS and the first passivation film PAS1.

A pixel electrode Px is formed on the organic insulation film INS, as shown in FIG. 4. The pixel electrode Px is connected to the drain electrode D of the thin film transistor TFT via the first contact hole CH1.

A second passivation film PAS2 is formed over the organic insulation film INS, including where the pixel electrode Px is formed. A touch sensing electrode connecting wire Rc1 is formed on the second passivation film PAS2 to overlap the data line DL. A second contact hole CH2 exposing the touch driving electrode connecting wire Tc11 is formed through the gate insulation film GI, the first passivation film PAS1, the organic insulation film INS, and the second passivation film PAS2. As shown in FIGS. 7B and 8B, the touch driving electrode Tx11 is formed on the second passivation film PAS2, and the touch sensing electrode Rx1 is formed over the second passivation film PAS2, including where the touch sensing electrode connecting wire Rc1 is formed. The touch driving electrode Tx11 is connected to the touch driving electrode connecting wire Tc11 via the second contact hole CH2, and the touch sensing electrode Rx1 covers the touch sensing electrode connecting wire Rc1.

In the above-described touch sensor integrated type display devices according to the first example embodiment of the present invention and its modified example, each touch driving electrode or each touch sensing electrode corresponds to a particular pixel electrode or a particular group of pixel electrodes, each touch driving electrode connecting wire corresponds to a particular gate line or a particular set of gate lines, and each touch sensing electrode connecting wire corresponds to a particular data line or a particular set of data lines. This makes it easy and efficient to form complex wires for the touch driving electrodes and the touch sensing electrodes.

Moreover, a separate touch driving electrode connecting wire is connected to each of the touch driving electrodes of the first to fourth touch driving electrode groups Tx11 to Tx14, Tx21 to Tx24, Tx31 to Tx34, and Tx41 to Tx44. The RC delay therefore can be maintained substantially the same, regardless of where each touch driving electrode is positioned, by adjusting the thickness or area of each touch driving electrode connecting wire. Therefore, the accuracy of touch recognition can be improved.

Figure 9:
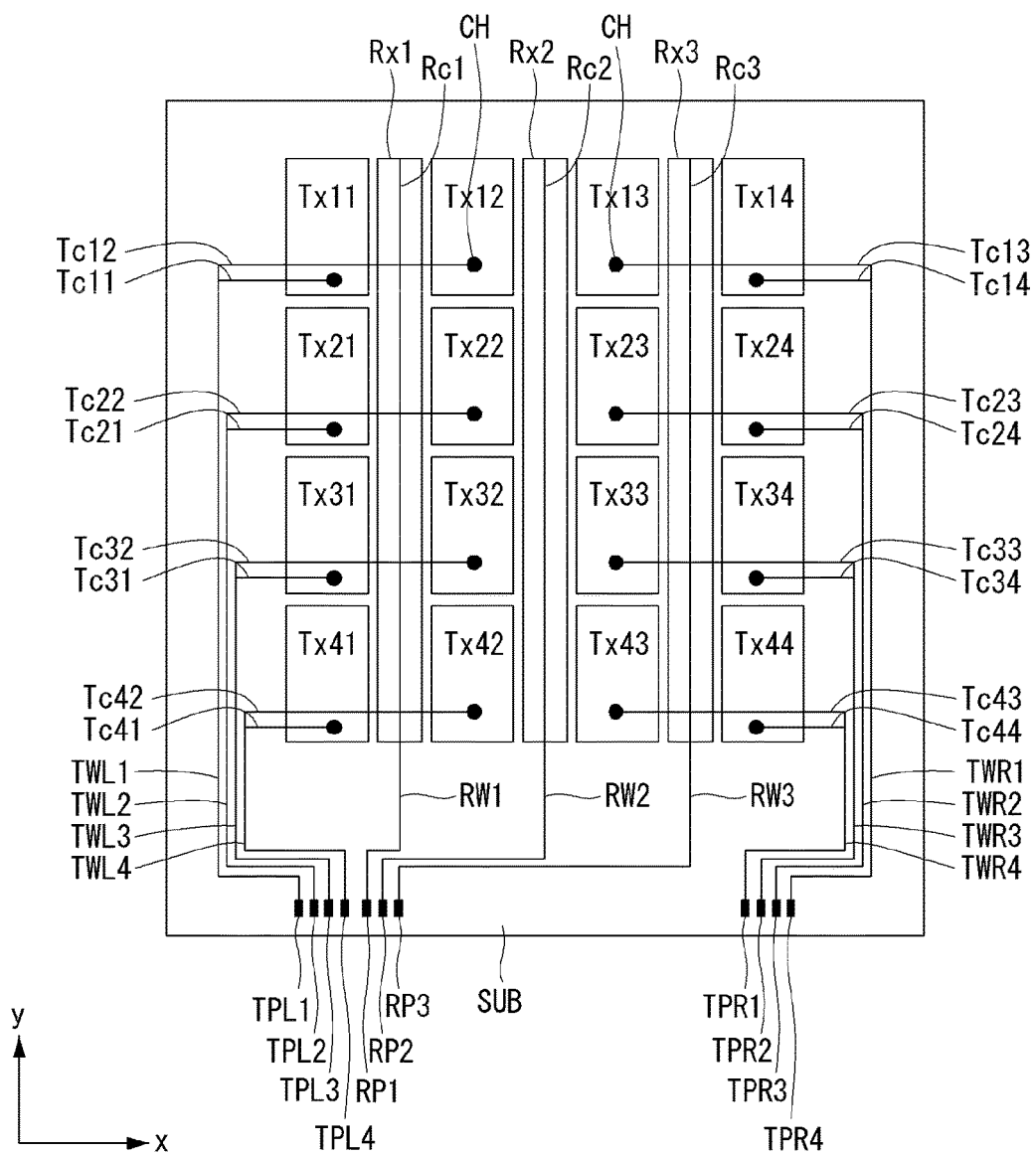
FIG. 9 is a top plan view schematically illustrating a touch sensor integrated type display device according to a second example embodiment of the present invention.

Next, a touch sensor integrated type display device according to a second example embodiment of the present invention will be described with reference to FIG. 9. FIG. 9 is a top plan view schematically illustrating a touch sensor integrated type display device according to the second example embodiment of the present invention.

In the touch sensor integrated type display device according to the second exemplary embodiment of the present invention, the touch driving electrode groups Tx11 to Tx14, Tx21 to Tx24, Tx31 to Tx34, and Tx41 to Tx44 are each divided into two. The touch driving electrode groups Tx11 and Tx12, Tx21 and Tx22, Tx31 and Tx32, and Tx41 and Tx42 on the left half are respectively connected to the first to fourth left touch driving electrode connecting wires Tc11 and Tc12, Tc21 and Tc22, Tc31 and Tc32, and Tc41 and Tc42, which extend to the left side of the active area. The touch driving electrode groups Tx13 and Tx14, Tx23 and Tx24, Tx33 and Tx34, and Tx43 and Tx44 on the right half are respectively connected to the first to fourth right touch driving electrode connecting wires Tc13 and Tc14, Tc23 and Tc24, Tc33 and Tc34, and Tc43 and Tc44, which extend to the right side of the active area, The first to fourth left touch driving electrode connecting wires Tc11 and Tc12, Tc21 and Tc22, Tc31 and Tc32, and Tc41 and Tc42 are respectively connected to first to fourth left touch driving pads TPL1 to TPL4 through first to fourth left touch driving routing wires TWL1 to TWL4. The first to fourth right touch driving electrode connecting wires Tc13 and Tc14, Tc23 and Tc24, Tc33 and Tc34, and Tc43 and Tc44 are respectively connected to first to fourth right touch driving pads TRP1 to TRP4 through first to fourth right touch driving routing wires TWR1 to TWR4.

The other components of the touch sensor integrated type display device according to the second example embodiment of the present invention may be the same or similar to those of the touch sensor integrated type display device according to the first example embodiment of the present invention, as well as its modified example, so further description will be omitted to avoid redundancy.

In the touch sensor integrated type display device according to the second example embodiment of the present invention, a touch driving voltage can be fed from both sides of the display device through the first to fourth left touch driving electrode connecting wires Tc11 and Tc12, Tc21 and Tc22, Tc31 and Tc32, and Tc41 and Tc42 located on the left side of all the touch driving electrodes and through the first to fourth right touch driving electrode connecting wires Tc13 and Tc14, Tc23 and Tc24, Tc33 and Tc34, and Tc43 and Tc44 located on the right side of all of the touch driving electrodes, respectively. Accordingly, a touch driving voltage can be fed to the touch driving electrodes without attenuation of a touch driving signal, leading to an improvement of the accuracy of touch recognition.

Figure 10:
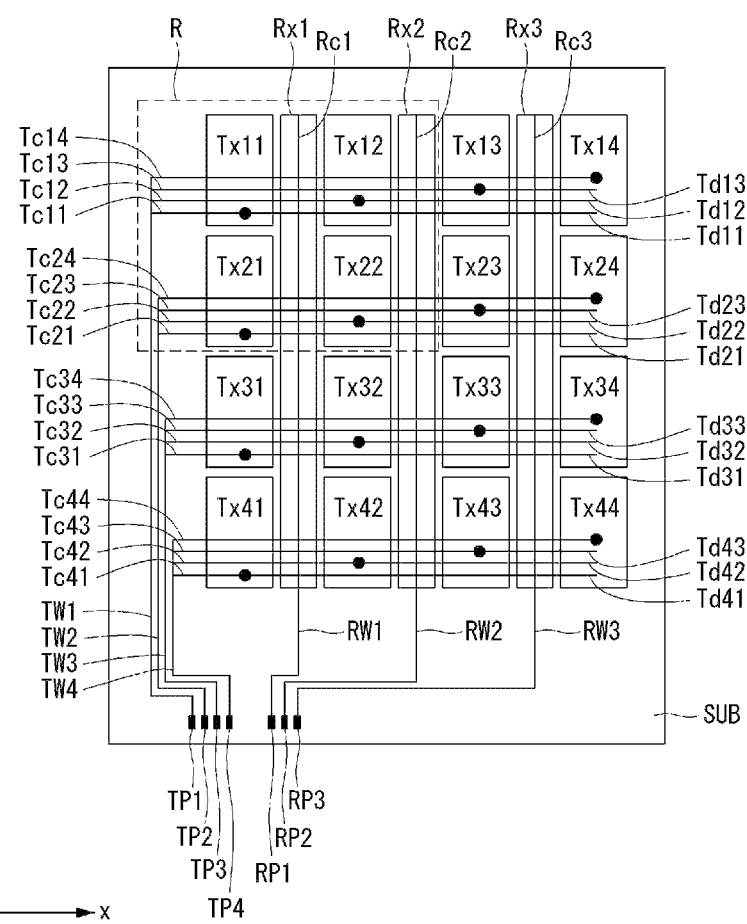
FIG. 10 is a top plan view schematically illustrating a touch sensor integrated type display device according to a third example embodiment of the present invention.

Next, a touch sensor integrated type display device according to a third example embodiment of the present invention will be described with reference to FIG. 10. FIG. 10 is a top plan view schematically illustrating a touch sensor integrated type display device according to the third example embodiment of the present invention.

The touch sensor integrated type display device according to the third example embodiment of the present invention has similar components as the touch sensor integrated type display device according to the second example embodiment of the present invention, except that the first to fourth dummy wires Td11 to Td13, Td21 to Td23, Td31 to Td33, and Td41 to Td43 are formed to make up the differences in length among the first to fourth touch driving electrode connecting wires Tx11 to Tx14, Tx21 to Tx24, Tx31 to Tx34, or Tx41 to Tx44.

For example, the 1-1 dummy wire Td11 extends from the 1-1 touch driving electrode connecting wire Tc11 to the position corresponding to the end of the 1-4 touch driving electrode connecting wire Tc14, and overlaps the 1-1 to 1-4 touch driving electrodes Tx11 to Tx14. The 1-2 dummy wire Td12 extends from the 1-2 touch driving electrode connecting wire Tc12 to the position corresponding to the end of the 1-4 touch driving electrode connecting wire Tc14, and overlaps the 1-2 to 1-4 touch driving electrodes Tx12 to Tx14. The 1-3 dummy wire Td13 extends from the 1-3 touch driving electrode connecting wire Tc13 to the position corresponding to the end of the 1-4 touch driving electrode connecting wire Tc14, and overlaps the 1-3 and 1-4 touch driving electrodes Tx13 and Tx14.

The 2-1 dummy wire Td21 extends from the 2-1 touch driving electrode connecting wire Tc21 to the position corresponding to the end of the 2-4 touch driving electrode connecting wire Tc24, and overlaps the 2-1 to 2-4 touch driving electrodes Tx21 to Tx24. The 2-2 dummy wire Td22 extends from the 2-2 touch driving electrode connecting wire Tc22 to the position corresponding to the end of the 2-4 touch driving electrode connecting wire Tc24, and overlaps the 2-2 to 2-4 touch driving electrodes Tx22 to Tx24. The 2-3 dummy wire Td23 extends from the 2-3 touch driving electrode connecting wire Tc23 to the position corresponding to the end of the 2-4 touch driving electrode connecting wire Tc24, and overlaps the 2-3 and 2-4 touch driving electrodes Tx23 and Tx24.

The 3-1 dummy wire Td31 extends from the 3-1 touch driving electrode connecting wire Tc31 to the position corresponding to the end of the 3-4 touch driving electrode connecting wire Tc34, and overlaps the 3-1 to 3-4 touch driving electrodes Tx31 to Tx34. The 3-2 dummy wire Td32 extends from the 3-2 touch driving electrode connecting wire Tc32 to the position corresponding to the end of the 3-4 touch driving electrode connecting wire Tc34, and overlaps the 3-2 to 3-4 touch driving electrodes Tx32 to Tx34. The 3-3 dummy wire Td33 extends from the 3-3 touch driving electrode connecting wire Tc33 to the position corresponding to the end of the 3-4 touch driving electrode connecting wire Tc34, and overlaps the 3-3 and 3-4 touch driving electrodes Tx33 and Tx34.

The 4-1 dummy wire Td41 extends from the 4-1 touch driving electrode connecting wire Tc41 to the position corresponding to the end of the 4-4 touch driving electrode connecting wire Tc44, and overlaps the 4-1 to 4-4 touch driving electrodes Tx41 to Tx44. The 4-2 dummy wire Td42 extends from the 4-2 touch driving electrode connecting wire Tc42 to the position corresponding to the end of the 4-4 touch driving electrode connecting wire Tc44, and overlaps the 4-2 to 4-4 touch driving electrodes Tx42 to Tx44. The 4-3 dummy wire Td43 extends from the 4-3 touch driving electrode connecting wire Tc43 to the position corresponding to the end of the 4-4 touch driving electrode connecting wire Tc44, and overlaps the 4-3 and 4-4 touch driving electrodes Tx43 and Tx44.

The other components of the touch sensor integrated type display device according to the third example embodiment of the present invention may be the same or similar to those of the touch sensor integrated type display device according to the first example embodiment of the present invention, and its modified example, so further description will be omitted to avoid redundancy.

In the touch sensor integrated type display device according to the third exemplary embodiment of the present invention, the mutual capacitance between neighboring touch driving electrode connecting wires can be maintained substantially the same at any position by means of dummy wires. Accordingly, the accuracy of touch recognition can be improved compared to the touch sensor integrated type display device according to the first exemplary embodiment of the present invention.

Figure 11:
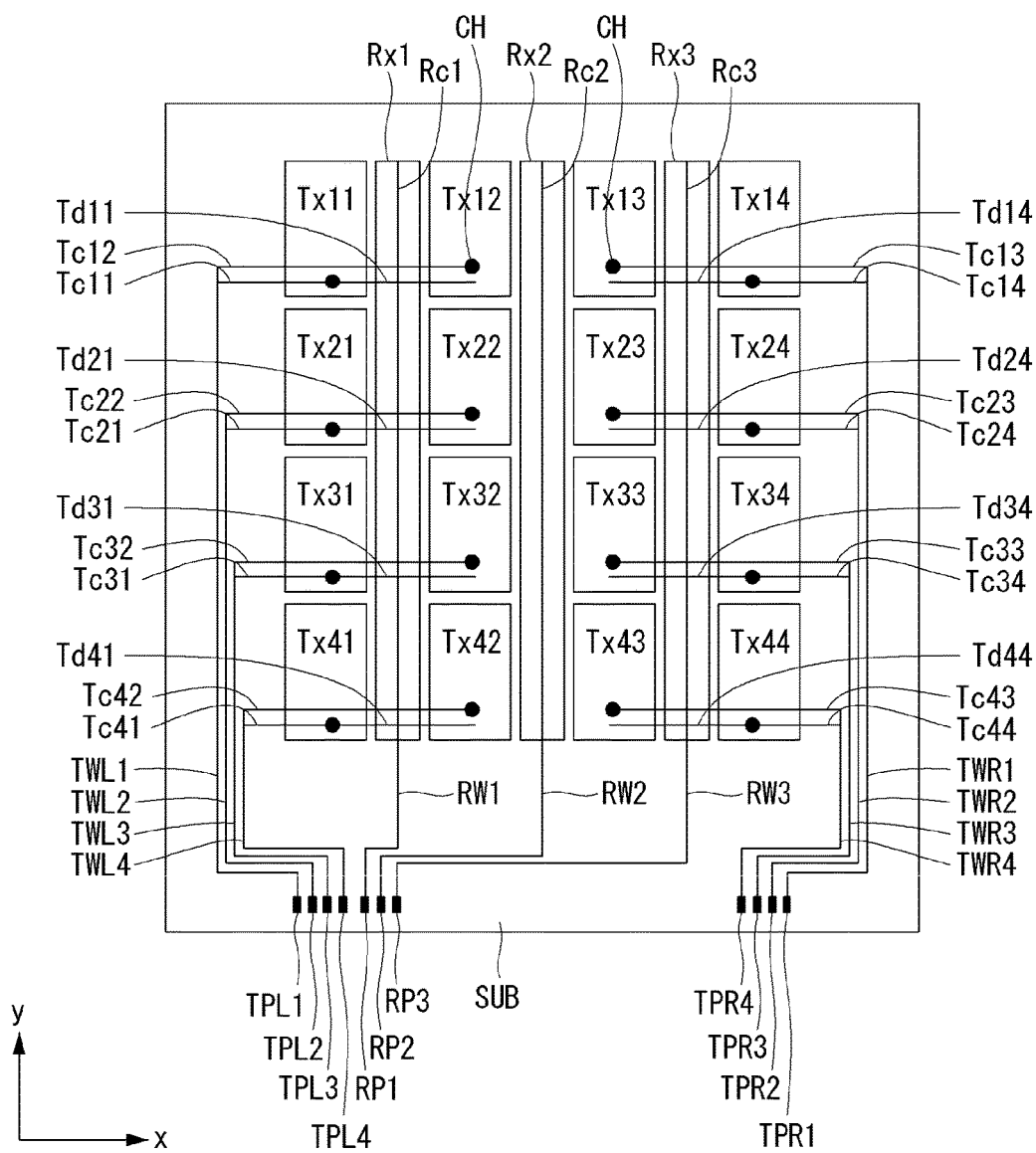
FIG. 11 is a top plan view schematically illustrating a touch sensor integrated type display device according to a fourth example embodiment of the present invention.

Next, a touch sensor integrated type display device according to a fourth example embodiment of the present invention will be described with reference to FIG. 11. FIG. 11 is a top plan view schematically illustrating a touch sensor integrated type display device according to the fourth example embodiment of the present invention.

The touch sensor integrated type display device according to the fourth exemplary embodiment of the present invention has similar components as the touch sensor integrated type display device according to the second example embodiment of the present invention, except that first to fourth dummy wires Td11 and Td14, Td21 and Td24, Td31 and Td34, and Td41 and Td44 are formed to make up the differences in length among the first to fourth touch driving electrode connecting wires Tc11 to Tc14, Tc21 to Tc24, Tc31 to Tc34, or Tc41 to Tc44.

For example, the 1-1 dummy wire Td11 extends from the 1-1 left touch driving electrode connecting wire Tc11 to the position corresponding to the end of the 1-2 left touch driving electrode connecting wire Tc12, and overlaps the 1-1 and 1-2 touch driving electrodes Tx11 and Tx12. The 1-4 dummy wire Td14 extends from the 1-4 right touch driving electrode connecting wire Tc14 to the position corresponding to the end of the 1-3 right touch driving electrode connecting wire Tc13, and overlaps the 1-3 and 1-4 touch driving electrodes Tx13 and Tx14.

The 2-1 dummy wire Td21 extends from the 2-1 left touch driving electrode connecting wire Tc21 to the position corresponding to the end of the 2-2 left touch driving electrode connecting wire Tc22, and overlaps the 2-1 and 2-2 touch driving electrodes Tx21 and Tx22. The 2-4 dummy wire Td24 extends from the 2-4 right touch driving electrode connecting wire Tc24 to the position corresponding to the end of the 2-3 right touch driving electrode connecting wire Tc23, and overlaps the 2-3 and 2-4 touch driving electrodes Tx23 and Tx24.

The 3-1 dummy wire Td31 extends from the 3-1 left touch driving electrode connecting wire Tc31 to the position corresponding to the end of the 3-2 left touch driving electrode connecting wire Tc32, and overlaps the 3-1 and 3-2 touch driving electrodes Tx31 and Tx32. The 3-4 dummy wire Td34 extends from the 3-4 right touch driving electrode connecting wire Tc34 to the position corresponding to the end of the 3-3 right touch driving electrode connecting wire Tc33, and overlaps the 3-3 and 3-4 touch driving electrodes Tx33 and Tx34.

The 4-1 dummy wire Td41 extends from the 4-1 left touch driving electrode connecting wire Tc41 to the position corresponding to the end of the 4-2 left touch driving electrode connecting wire Tc42, and overlaps the 4-1 and 4-2 touch driving electrodes Tx41 and Tx42. The 4-4 dummy wire Td44 extends from the 4-4 right touch driving electrode connecting wire Tc44 to the position corresponding to the end of the 4-3 right touch driving electrode connecting wire Tc43, and overlaps the 4-3 and 4-4 touch driving electrodes Tx43 and Tx44.

The other components of the touch sensor integrated type display device according to the fourth example embodiment of the present invention may be the same or similar to those of the touch sensor integrated type display device according to the second example embodiment of the present invention, so further description will be omitted to avoid redundancy.

In the touch sensor integrated type display device according to the fourth example embodiment of the present invention, the mutual capacitance between neighboring touch driving electrode connecting wires can be maintained substantially the same at any position by means of dummy wires. Accordingly, the accuracy of touch recognition can be improved compared to the touch sensor integrated type display device according to the second example embodiment of the present invention.

Although particular embodiments of the present invention have been illustrated and described, it will be apparent to those skilled in the art that various changes and modifications can be made without departing from the spirit or scope of the present invention. For example, while the first to fourth example embodiments have been described with respect to an example in which the first passivation film for thin film transistor protection and the organic insulation film for planarization are separately formed, the two functions may be achieved solely by either the first passivation film or the organic insulation film. As another example, a different number of touch driving electrodes, touch sensing electrodes, touch driving electrode connecting wires, or touch sensing electrode connecting wires than the number used in the specific example embodiments described above may be employed without departing from the spirit or scope of the present invention. Accordingly, the technical scope of the present invention is not limited to the detailed description of the example embodiments, but should be defined by the appended claims. It is intended that the present invention cover the modifications and variations of the disclosed embodiments provided they come within the scope of the appended claims and their equivalents.

What is claimed is:
1. A touch sensor integrated type display device comprising:
   a plurality of gate lines and a plurality of data lines crossing the gate lines;
   a plurality of pixel electrodes disposed in regions defined by crossings of the gate lines and the data lines;
   a plurality of common electrodes in an active area of the display device and overlapping the pixel electrodes, the common electrodes comprising
      a first group of first electrodes arranged in a same row in a first direction, and
      a plurality of second electrodes, each disposed between two adjacent first electrodes and extending in a second direction substantially perpendicular to the first direction;
   a plurality of first electrode connecting wires, each extending in the first direction, each interposed between pixel electrodes in two adjacent rows and connected in the active area to only a corresponding one of the first electrodes in the first group without being connected in the active area to the others of the first electrodes in the first group, at least one of the first electrode connecting wires crossing, without being connected to, at least one of the second electrodes; and
   a first routing wire in parallel to the data lines and connecting the first electrode connecting wires with one another outside the active area where the common electrodes are disposed, the first routing wire transmitting a driving signal to the first group of first electrodes.

2. The touch sensor integrated type display device of claim 1, further comprising a plurality of second electrode connecting wires, each extending in the second direction, and overlapping and connected to a respective one of the second electrodes.

3. The touch sensor integrated type display device of claim 1, wherein at least two of the first electrode connecting wires differ in length from each other, and include a shorter first electrode connecting wire and a longer first electrode connecting wire, and
 wherein the longer first electrode connecting wire overlaps, without being connected in the active area to, the first electrode connected in the active area to the shorter first electrode connecting wire.

4. The touch sensor integrated type display device of claim 3, further comprising a dummy wire that extends in the first direction from one end of the shorter first electrode connecting wire substantially in parallel with the longer first electrode connecting wire so that a combined length of the dummy wire and the shorter first electrode connecting wire is substantially equal to a length of the longer first electrode connecting wire.

5. The touch sensor integrated type display device of claim 1, further comprising:
 a substrate;
 a gate insulation film;
 thin film transistors near the crossings of the gate lines and data lines; and
 a first passivation film covering the thin film transistors,
 wherein the first electrode connecting wires and the gate lines are formed over the substrate, each of the first electrode connecting wires being located in proximity to and separated from a corresponding one of the gate lines,
 wherein the gate insulation film covers the first electrode connecting wires and the gate lines, and
 wherein the first electrodes are formed over the first passivation film, each of the first electrodes being connected to only the corresponding one of the first electrode connecting wires via a first contact hole through the gate insulation film and the first passivation film.

6. The touch sensor integrated type display device of claim 5, further comprising a plurality of second electrode connecting wires,
 wherein the second electrodes are formed over the first passivation film, and each of the second electrode connecting wires is formed over and is connected to a respective one of the second electrodes.

7. The touch sensor integrated type display device of claim 6, further comprising a second passivation film over the first electrodes and the second electrodes,
 wherein the pixel electrodes are formed over the second passivation film, each of the pixel electrodes being connected to a drain of a respective one of the thin film transistors via a second contact hole through the first passivation film and the second passivation film.

8. The touch sensor integrated type display device of claim 6, wherein the data lines are formed over the gate insulation film, and each of the second electrode connecting wires overlaps a respective one of the data lines.

9. The touch sensor integrated type display device of claim 1, further comprising:
 a substrate;
 a gate insulation film;
 thin film transistors near the crossings of the gate lines and data lines;
 a first passivation film covering the thin film transistors; and
 a second passivation film formed over the pixel electrodes,
 wherein the first electrode connecting wires and the gate lines are formed over the substrate, each of the first electrode connecting wires being located in proximity to and separated from a corresponding one of the gate lines,
 wherein the gate insulation film covers the first electrode connecting wires and the gate lines,
 wherein the pixel electrodes are formed over the first passivation film, each of the pixel electrodes being connected to a drain of a respective one of the thin film transistors via a first contact hole through the first passivation film, and
 wherein the first electrodes are formed over the second passivation film, each of the first electrodes being connected to only the corresponding one of the first electrode connecting wires via a second contact hole through the gate insulation film, the first passivation film, and the second passivation film.

10. The touch sensor integrated type display device of claim 9, further comprising a plurality of second electrode connecting wires,
 wherein the data lines are formed over the gate insulation film and are covered by the first passivation film,
 wherein the second electrode connecting wires are formed over the second passivation film, each of the second electrode connecting wires overlapping a respective one of the data lines, and
 wherein each of the second electrodes covers and is connected to a respective one of the second electrode connecting wires.

11. The touch sensor integrated type display device of claim 1, further comprising a first substrate and a second substrate joined together and facing each other,
 wherein the gate lines, the data lines, and the pixel electrodes are disposed on the first substrate, and
 wherein the common electrodes are disposed on the second substrate.

12. The touch sensor integrated type display device of claim 1, further comprising a plurality of groups of first electrodes, the first electrodes arranged in a matrix form with each group of the first electrodes arranged in the first direction.

13. The touch sensor integrated type display device of claim 1, wherein the first electrodes are touch driving electrodes, and the second electrodes are touch sensing electrodes.

14. The touch sensor integrated type display device of claim 1, wherein at least one of the first electrode connecting wires overlaps, without being connected in the active area to, at least one of the first electrodes.

15. A touch sensor integrated type display device comprising:
 a substrate having an active area and an inactive area;
 a plurality of gate lines and a plurality of first electrode connecting wires over the substrate, the first electrode connecting wires extending in a first direction in the active area and connected with one another through a first routing wire in the inactive area, the first routing wire extending in a second direction;
 a gate insulation film over the gate lines and the first electrode connecting wires;
 a plurality of data lines over the gate insulation film and crossing the gate lines;

a plurality of thin film transistors formed near crossings of the data lines and the gate lines, each of the thin film transistors including a drain over the gate insulation film;

a first passivation film over the thin film transistors, the data lines, and the gate insulation film; and a plurality of common electrodes in the active area and over the first passivation film, the common electrodes including a plurality of first electrodes arranged in a same row in the first direction and a plurality of second electrodes disposed between the first electrodes and extending in the second direction substantially perpendicular to the first direction, wherein each of the first electrodes is connected to a respective one of the first electrode connecting wires via a first contact hole through the gate insulation film and the first passivation film, and wherein, in the active area, at least one of the first electrode connecting wires is connected to only one of the first electrodes without being connected to the others of the first electrodes.

16. The touch sensor integrated type display device of claim 15, further comprising a plurality of second electrode connecting wires extending in the second direction, each being formed over and connected to a respective one of the second electrodes, wherein each of the second electrode connecting wires overlaps a respective one of the data lines.

17. The touch sensor integrated type display device of claim 16, further comprising:

a second passivation film over the first electrodes and the second electrodes; and a plurality of pixel electrodes over the second passivation film, wherein each of the pixel electrodes overlaps a respective one of the common electrodes and is connected to a drain of a respective one of the thin film transistors via a second contact hole through the first passivation film and the second passivation film.

18. The touch sensor integrated type display device of claim 15, wherein the at least one of the first electrode connecting wires overlaps, without being connected in the active area to, at least one of the others of the first electrodes.

19. A touch sensor integrated type display device comprising:

a substrate having an active area and an inactive area;

a plurality of gate lines and a plurality of first electrode connecting wires over the first substrate, the first electrode connecting wires extending in a first direction in the active area and connected with one another through a first touting wire in the inactive area, the first routing wire extending in a second direction;

a gate insulation film over the gate lines and the first electrode connecting wires;

a plurality of data lines over the gate insulation film and crossing the gate lines;

a plurality of thin film transistors formed near crossings of the data lines and the gate lines, each of the thin film transistors including a drain over the gate insulation film;

a first passivation film over the thin film transistors, the data lines, and the gate insulation film;

a plurality of pixel electrodes over the first passivation film, each of the pixel electrodes being connected to a drain of a respective one of the thin film transistors via a first contact hole through the first passivation film;

a second passivation film over the pixel electrodes; and a plurality of common electrodes in the active area and over the second passivation film, the common electrodes including a plurality of first electrodes arranged in a same row in the first direction and a plurality of second electrodes disposed between the first electrodes and extending in the second direction substantially perpendicular to the first direction, wherein each of the first electrodes is connected to a respective one of the first electrode connecting wires via a second contact hole through the gate insulation film, the first passivation film, and the second passivation film, and wherein, in the active area, at least one of the first electrode connecting wires is connected to only one of the first electrodes without being connected to the others of the first electrodes.

20. The touch sensor integrated type display device of claim 19, further comprising a plurality of second electrode connecting wires over the second passivation film and extending in the second direction, each of the second electrode connecting wires overlapping a respective one of the data lines, wherein each of the second electrodes covers and is connected to a respective one of the second electrode connecting wires.

21. The touch sensor integrated type display device of claim 19, wherein the at least one of the first electrode connecting wires overlaps, without being connected in the active area to, at least one of the others of the first electrodes.

* * * * *